United States Patent [19]
Hatti et al.

[11] Patent Number: 6,135,400
[45] Date of Patent: Oct. 24, 2000

[54] OPTICAL ALIGNMENT FIXTURE

[75] Inventors: Harsha Mysore Hatti, Schenectady, N.Y.; Paul Charles Bigby, Southfield, Mich.

[73] Assignee: General Electric Company, Schenectady, N.Y.

[21] Appl. No.: 09/198,634

[22] Filed: Nov. 24, 1998

[51] Int. Cl.[7] .................................................. F16M 11/04
[52] U.S. Cl. ........................................ 248/178.1; 359/896
[58] Field of Search .................................. 248/469, 178.1, 248/475.1, 476, 477, 629, 664, 667, 672, 144, 145, 418, 422, 479, 125.2, 485, 486, 487, 291.1, 292.11, 292.12, 278.1, 514, 419; 355/55, 122; 416/117; 359/896

[56] References Cited

U.S. PATENT DOCUMENTS

| | | | |
|---|---|---|---|
| 4,097,190 | 6/1978 | White | 416/117 |
| 4,138,082 | 2/1979 | Fatemi | 248/419 |
| 4,340,812 | 7/1982 | Mori | 250/203 R |
| 4,482,225 | 11/1984 | Moyroud et al. | 354/5 |
| 5,101,583 | 4/1992 | Scordilis | 37/91 |

*Primary Examiner*—Ramon O. Ramirez
*Assistant Examiner*—Tan Le
*Attorney, Agent, or Firm*—Marvin Snyder; Douglas E. Stoner

[57] ABSTRACT

An optical alignment fixture includes a carriage pivotally joined to a frame for supporting an optical element. A worm wheel is joined to the carriage, and a driveshaft is mounted to the frame. A worm at one end of the driveshaft is engaged with the worm wheel for rotating the worm wheel and the carriage upon rotation of the driveshaft.

10 Claims, 3 Drawing Sheets

OPTICAL ALIGNMENT FIXTURE

BACKGROUND OF THE INVENTION

The present invention relates generally to optical systems, and, more specifically, to fixturing of elements in such systems.

In an exemplary optical system, various optical elements, such as mirrors and lenses, must be precisely aligned for controlling light transmission, such as a laser beam, among such elements. The optical elements may be disposed in one or more planes, with the laser beam being transmitted from element to element.

Each element must be precisely located in space for achieving proper alignment with cooperating elements. Optical element location is controlled by three orthogonal translation axes and up to three rotational axes, for a total of up to six degrees of freedom.

Alignment of the individual optical elements in the six degrees of freedom is typically effected using corresponding mounts or stages. A typical mounting stage provides three translational degrees of freedom along three corresponding axes. The elements may be additionally aligned relative to the mounting stage with up to three rotational orientations.

The translation stages provide precision adjustment of the location of the individual optical elements. However, the rotational adjustments are fixed, or limited to only a few degrees of rotation, or are interdependent with the translational stage, thus limiting the ability to precisely align the individual elements.

Accordingly, it is desired to provide an optical alignment fixture having precision rotational control over a large angular range which may be effected independently of translation alignment of the element.

BRIEF SUMMARY OF THE INVENTION

An optical alignment fixture includes a carriage pivotally joined to a frame for supporting an optical element. A worm wheel is joined to the carriage, and a driveshaft mounted to the frame has a worm at one end operably engaged with the worm wheel for rotation of the wheel and the carriage upon rotation of the driveshaft.

DETAILED DESCRIPTION OF THE INVENTION

Figure 1:
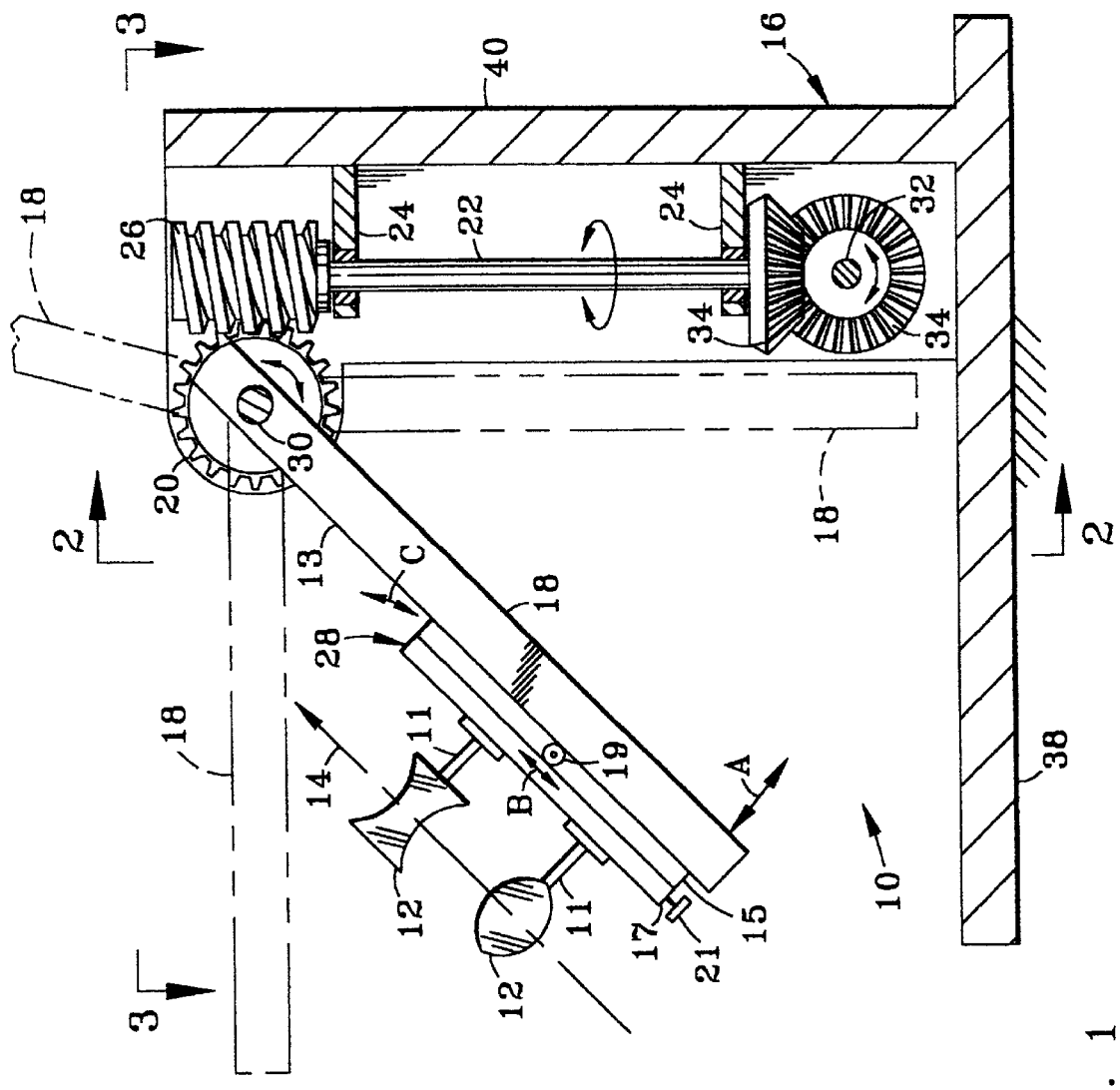
FIG. 1 is a elevational, partly sectional side view of an optical alignment fixture in accordance with an exemplary embodiment of the present invention.

FIG. 1 illustrates an optical alignment fixture 10 configured for supporting and aligning one or more optical elements 12 in an optical system (not shown). The individual optical elements 12 may be of any conventional form such as the two concave and convex lenses 12 illustrated, or may be of other forms such as mirrors and other optical elements used, for example, in an optical laser system. Optical elements 12 must be precisely aligned within the optical system for transmitting light, such as in the form of a laser beam 14.

Fixture 10 includes a stationary frame 16 having a swing arm or carriage 18 pivotally joined thereto for rotation. Carriage 18 is configured for supporting one or more of optical elements 12, each with its own corresponding supporting bracket 11.

A worm wheel 20 is affixed or integrally joined to carriage 18, and a cooperating driveshaft 22 is rotatably mounted to the frame in a pair of spaced apart support brackets 24, which may take any conventional form, including bushings or bearings, for precisely mounting the driveshaft to the frame relative to worm wheel 20 and attached carriage 18.

The driveshaft includes a coaxial worm 26 in the form of a gear disposed at a distal end of the driveshaft and affixed to the cooperating worm wheel 20 for rotation thereof and rotation of the carriage joined to wheel 20, upon rotation of the driveshaft.

Carriage 18 has an angular position A measured relative to a vertical axis which may be precisely adjusted over a substantial angular range by simply rotating driveshaft 22, which rotates worm 26 for pivoting worm wheel 20 attached to carriage 18. The worm gear and wheel arrangement is preferred for preventing unintended changes in the angular position of carriage 18 and optical elements 12 attached thereto, since worm 26 may drive wheel 20, while wheel 20 cannot drive worm 26.

Carriage 18 acts as a cantilever, with its own weight maintaining a constant back force between worm wheel 20 and worm 26, thus eliminating or reducing any undesirable backlash in the supported carriage. When the carriage is adjusted to a specific angular position, it is self-retained at that position for maintaining accurate alignment of the optical elements at a fixed orientation in space.

In order to effect fine or precision adjustment of the angular position of carriage 18, the worm 26 and worm wheel 20 are sized and configured with suitable pitch for effecting gear reduction from driveshaft 22 to pivoted carriage 28. For example, a reduction ratio of 1:100 may be effected in the worm arrangement so that one-hundred revolutions of driveshaft 22 would be effective for rotating worm wheel 20 by a single revolution. In this way, fine adjustment of the angular position A may be achieved with an exemplary precision of about an arc minute. Such precision is effected solely by the worm reduction configuration, which also self-retains the carriage 18 using its own weight, and eliminates or reduces backlash for back driving driveshaft 22.

Preferably, fixture 10 also includes means in the form of a translation stage 28 affixed atop carriage 18 for supporting the optical elements, with the stage being adjustable for translating the optical elements atop the carriage.

In a preferred embodiment, a stage 28 is configured for translating the optical elements along two mutually perpendicular or orthogonal translation axes B,C atop the carriage surface 13. The stage may take any conventional form and typically includes a pair of cross plates or slides 15 and 17, each driven by a respective screw rod having adjustment knobs 19 and 21, respectively, for manual adjustment.

As shown in FIG. 1, carriage 18 is in the form of a flat plate pivotally joined at a proximal end to frame 16, and stage 28 is mounted to the carriage adjacent an opposite, distal end thereof. In this way, the weight of optical elements 12 and stage 28 is concentrated at the carriage distal end, thus providing a torque-removing backlash between the worm and its wheel.

Figure 2:
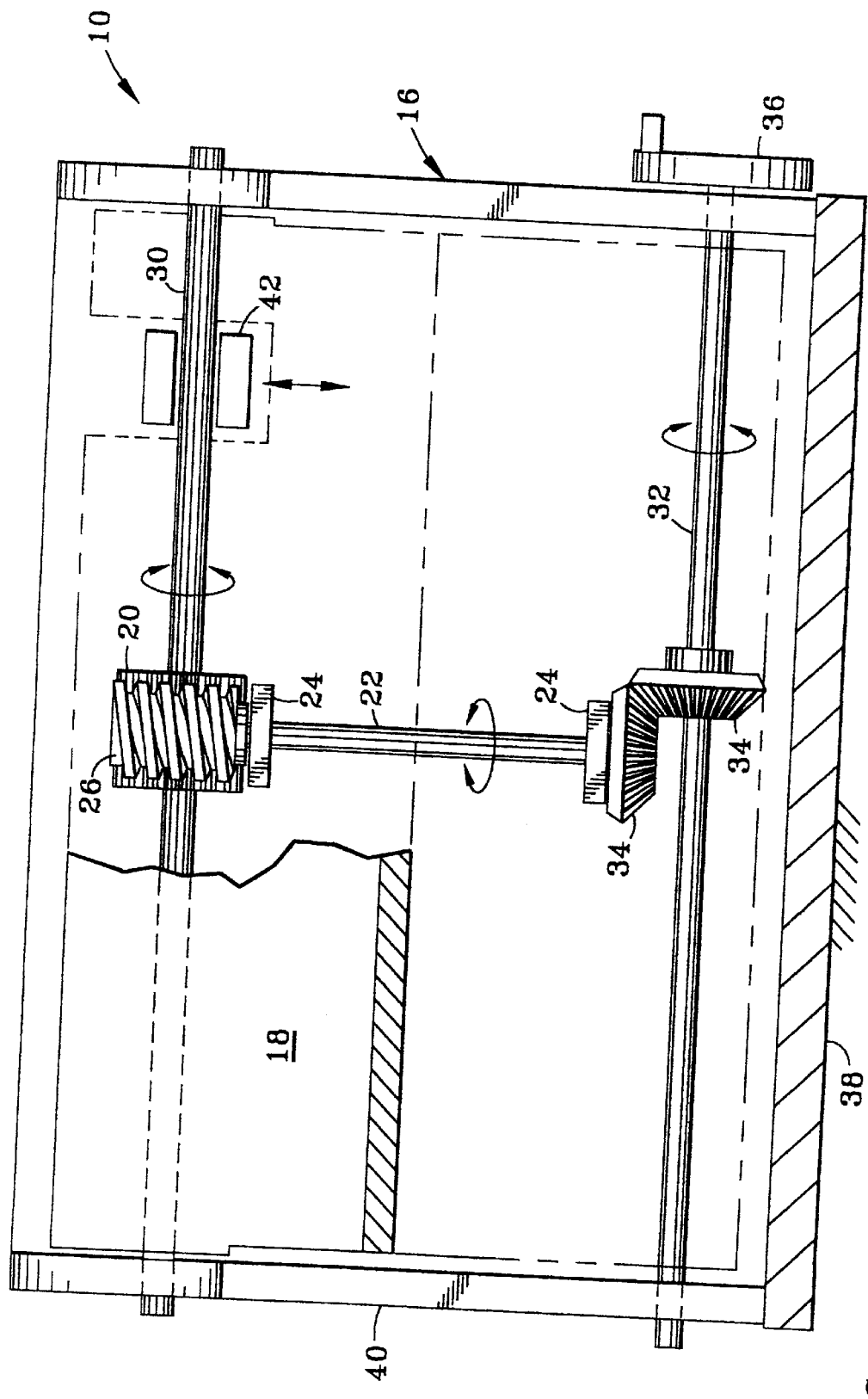
FIG. 2 is an elevational, partly sectional front view of the fixture illustrated in FIG. 1 and taken along line 2—2.
Figure 3:
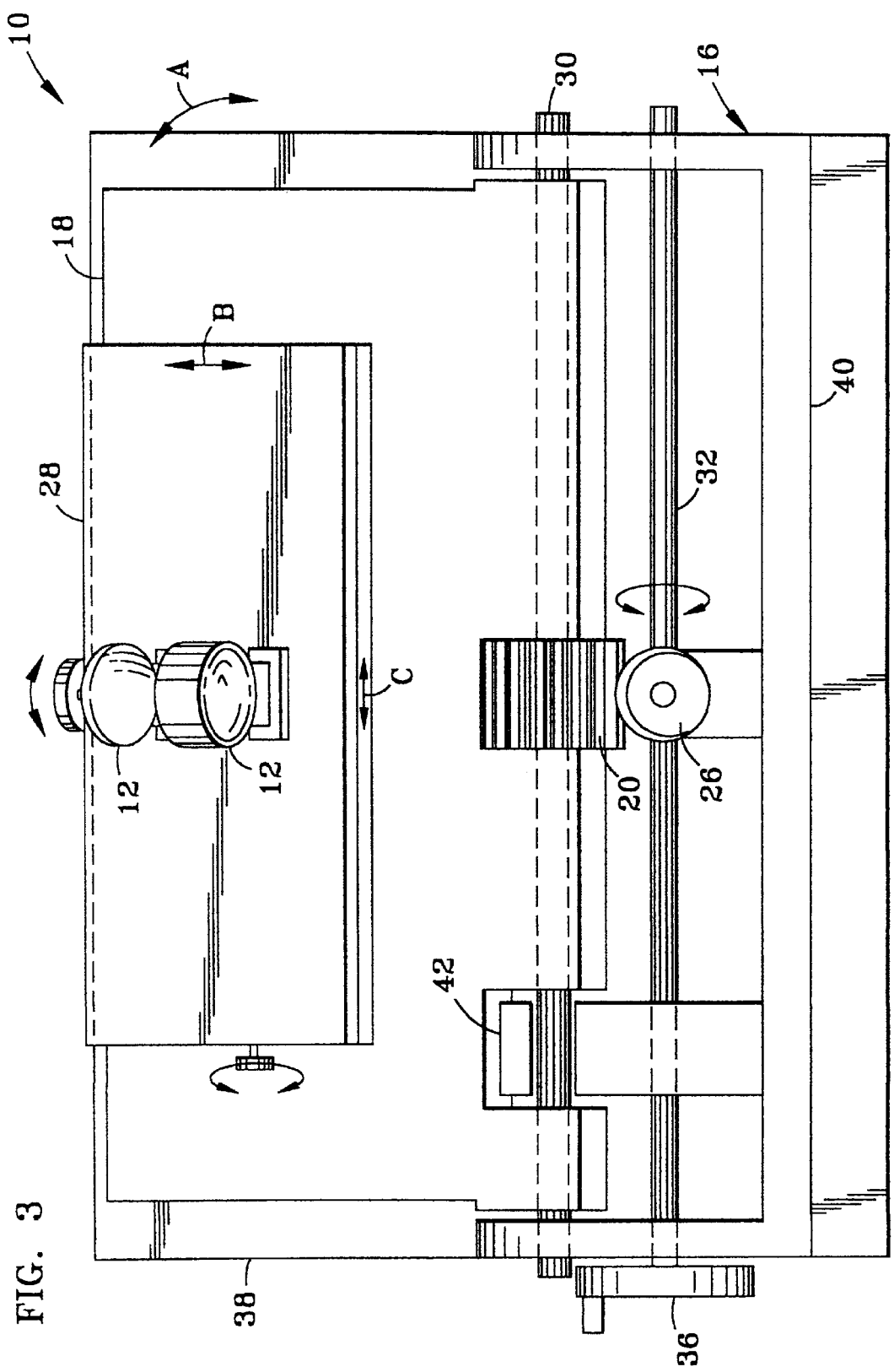
FIG. 3 is a top view of the fixture illustrated in FIG. 1 and taken along line 3—3.

In the preferred embodiment illustrated in FIGS. 1–3, a pivot shaft 30 extends through the carriage proximal end and is affixed to the carriage. Axially opposite ends of pivot shaft 30 are suitably mounted in supporting bushings or bearings in frame 16 for permitting precise angular adjustment of the carriage relative to frame 16.

As shown in FIGS. 2 and 3, worm wheel 20 is preferably joined to carriage 18 at its proximal end centrally between the opposite sides thereof in a symmetrical manner for balancing the adjustment load from worm 26 and the reaction loads at the two opposite pivot points defined at the ends of pivot shaft 30.

As illustrated in FIGS. 1 and 2, the fixture preferably includes an adjustment shaft 32 rotatably mounted to frame 16 using suitable bushings or bearings in the frame at opposite ends thereof. Adjustment shaft 32 is preferably disposed perpendicular to driveshaft 22 in a compact arrangement for permitting unobstructed angular adjustment of carriage 18. This may be effected by using a pair of meshed bevel gears 34 affixed, respectively, to adjustment shaft 32 near its center, and driveshaft 22 at its opposite, proximal end.

An adjustment wheel or knob 36 is affixed to one end of adjustment shaft 32 for manually rotating this shaft to rotate driveshaft 22 through the meshed bevel gears 34, and in turn rotating carriage 18 through worm 26 and worm wheel 20.

By mounting one of the bevel gears 34 at one end of driveshaft 22, and worm 26 at an opposite end of the driveshaft, only two shafts are needed for precisely adjusting carriage 18 and the number of precisely located components in fixture 10 is minimized. Adjustment knob 36 is located to one side of the fixture and permits fine angular adjustment of carriage 18 without obstruction or distortion of the cooperating fixture components.

As shown in FIG. 1, frame 16 preferably includes a horizontal base plate 38 and a vertical tower 40, also in the form of a plate, fixedly joined together. Carriage 18 is pivotally joined to a top end of tower 40 through corresponding side flanges thereof.

Driveshaft 22 is mounted vertically in tower 40 within brackets 24 attached to the tower. Adjustment shaft 32, as illustrated in FIGS. 2 and 3, is preferably mounted horizontally above the base plate, and is rotatably mounted to the side flanges of tower 40 or, alternatively, to base plate 38.

As shown in FIG. 1, worm wheel 20 is preferably sized for rotating carriage 18 between a vertical position, shown in phantom, parallel to tower 40, and a horizontal position, also shown in phantom, parallel to base plate 38 and perpendicular to the tower. In this way, carriage 18 may be precisely positioned at any angular position over at least a 90° arc, if not greater, as also shown in phantom. Worm wheel 20 may be a partial ring, or full ring as illustrated, with sufficient circumferential angular extent for cooperating with worm 26 to pivot carriage 18 over any desired angular range and position.

In operation, one of optical elements 12 may be fixedly mounted to stage 28 which is supported on carriage 18. The entire fixture 10 may be placed in rough alignment in the intended optical system (not shown). Carriage 18 may then be pivoted to the desired angular position A by simply rotating adjustment knob 36. The optical elements may thus be precisely rotated in space upon carriage 18, and the optical elements may be translated along both axes B,C by manual adjustment of the corresponding knobs 19 and 21 for the two slides 15 and 17 of stage 28. The weight of carriage 18 effectively locks worm wheel 20 in engagement with worm 26 and maintains accurate alignment of the optical elements in space.

If desired, a suitable brake 42, as illustrated in FIG. 2, may be disposed adjacent pivot shaft 30 for frictionally engaging that shaft with corresponding brake shoes held in compression against the shaft to lock carriage 18 at any angular position. Brake 42 may be of any conventional form, and upon selectively locking pivot shaft 30, the brake ensures a redundant locking mechanism for carriage 18.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A fixture for aligning an optical element comprising:
    a stationary frame;
    a carriage for supporting said optical element and pivotally joined to said frame for rotation relative thereto;
    a worm wheel fixedly joined to said carriage; and
    a driveshaft rotatably mounted to said frame, and having a worm at one end operably engaged with said worm wheel for rotation of said wheel and carriage upon rotation of said driveshaft.

2. A fixture according to claim 1 wherein said worm and worm wheel are sized for effecting gear reduction from said driveshaft to said carriage.

3. A fixture according to claim 2 further comprising a stage mounted atop said carriage for supporting said optical element and being adjustable for translating said element atop said carriage.

4. A fixture according to claim 3 wherein:
    said carriage comprises a plate pivotally joined at a proximal end thereof to said frame;
    said stage is mounted to said carriage adjacent an opposite, distal end thereof; and
    said worm wheel is joined to said carriage at said proximal end substantially centrally between opposite sides of said carriage.

5. A fixture for aligning an optical element comprising:
    a frame:
    a carriage for supporting said optical element and pivotally joined to said frame for rotation relative thereto;
    a worm wheel fixedly joined to said carriage;
    a driveshaft rotatably mounted to said frame and having a worm at one end operably engaged with said worm wheel for rotation of said wheel and carriage upon rotation of said driveshaft, said worm and worm wheel being sized for effecting gear reduction from said driveshaft to said carriage;
    a stage mounted atop said carriage for supporting said optical element and being adjustable for translating said element atop said carriage, said carriage comprising a plate pivotally joined at a proximal end thereof to said frame, said stage being mounted to said carriage adjacent an opposite, distal end thereof, and said worm wheel being joined to said carriage at said proximal end substantially centrally between opposite sides of said carriage;
    said fixture further comprising:
    an adjustment shaft rotatably mounted to said frame substantially perpendicular to said driveshaft; and
    a pair of meshed bevel gears, one of said bevel gears being affixed to said adjustment shaft and the other of said bevel gears being affixed to said driveshaft.

6. A fixture according to claim 5 further comprising an adjustment knob affixed to one end of said adjustment shaft for manually rotating said adjustment shaft so as to rotate said driveshaft through said bevel gears and to rotate said carriage through said worm and worm wheel.

7. A fixture according to claim 6 wherein said frame comprises:

a horizontal base plate; and a vertical tower affixed to said baseplate;

wherein said carriage is pivotally joined to said frame at a top end of said tower.

8. A fixture according to claim 7 wherein:

said driveshaft is mounted substantially vertically to said tower; and said adjustment shaft is positioned substantially horizontally above said base plate.

9. A fixture according to claim 8 wherein said worm wheel is sized for rotating said carriage between a vertical position substantially parallel to said tower, and a horizontal position substantially parallel to said base plate.

10. A fixture according to claim 9 wherein said stage is configured for translating said optical element along two mutually perpendicular axes atop said carriage.

* * * * *